United States Patent [19]

Swartzendruber et al.

[11] Patent Number: 4,913,392
[45] Date of Patent: Apr. 3, 1990

[54] MOUNTING BRACKET

[75] Inventors: James A. Swartzendruber, West Bend; Martin W. Arndt, Juneau, both of Wis.

[73] Assignee: Deere & Company, Moline, Ill.

[21] Appl. No.: 347,632

[22] Filed: May 5, 1989

[51] Int. Cl.$^4$ ............................................. A47B 96/06
[52] U.S. Cl. .............................. 248/231.9; 248/211.3; 248/222.2; 248/300; 403/252
[58] Field of Search ...................... 248/231.9, 247, 300, 248/218.4, 219.3, 201, 220.2, 222.2, 231.1; 362/396, 371, 432; 403/240, 252, 254

[56] References Cited

U.S. PATENT DOCUMENTS

| | | | |
|---|---|---|---|
| 3,341,163 | 9/1967 | Honie | 248/291 |
| 4,025,019 | 5/1977 | Jacobsen et al. | 248/300 X |
| 4,576,302 | 3/1986 | Smolik | 248/222.2 X |

OTHER PUBLICATIONS

John Deere Lawn Tractors and Riding Mowers.

Primary Examiner—Ramon O. Ramirez

[57] ABSTRACT

A mounting bracket is provided for supporting a headlight, mirror or similar accessory on the wall of a vehicle panel. The bracket includes two L-shaped clips which can be secured to the wall by inserting part of the clip through an opening in the wall and slipping a jawed portion over the wall section of the wall adjacent the opening. A bolt or similar structure interconnects the two clips to draw them together and assure pinching engagement of each jaw with the inside and outside surfaces of the wall. The brackets are particularly useful for mounting accessories to wall surfaces where access to the inside of the walls is difficult.

16 Claims, 2 Drawing Sheets

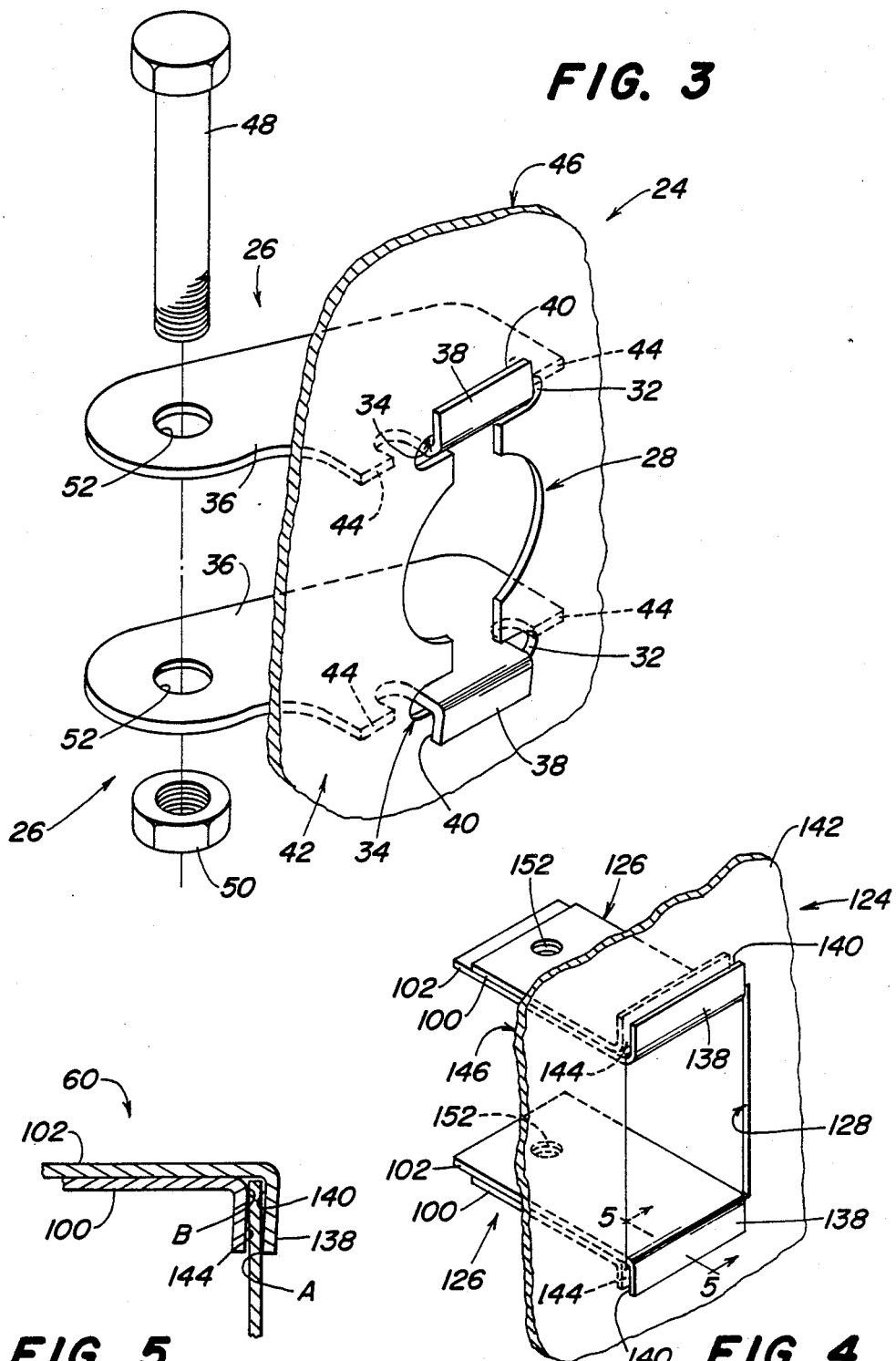

MOUNTING BRACKET

BACKGROUND OF THE INVENTION

1. Field of the Invention

The present invention relates generally to brackets for supporting various devices on a wall surface and more specifically relates to a bracket for mounting headlights on the steering column housing of a lawn and garden tractor.

2. Description of Related Art

The popularity of lawn and garden tractors has grown substantially in recent times and, accordingly, more economical models have been provided in the form of small riding tractors. These tractors are used primarily for mowing lawns during the daylight hours and have not, in the past, been equipped with lights as standard equipment.

As the versatility of these small economical riding tractors has increased, additional options to broaden their application have been developed. Snowblowers, for example, can now be used with these small riding mowers and there has now developed the need to equip them with lighting accessories so that the tractor can be used with the snowblower attachment during the darker winter hours.

Since the use of these tractors during other than daylight hours would not be desirable to many purchasers, there is a need for an optional means of equipping the tractors with lighting equipment, either during the manufacturing phase or when the customer desires to add lights after purchase of the tractor.

Accordingly, there is required an inexpensive mounting mechanism which permits the quick and easy installation of lights or other accessories either during the manufacture of the tractor or after purchase by the customer. This mounting mechanism must work when access inside a tractor panel or housing wall is difficult and should permit the simple mounting of lights, mirrors, horns, shields, or other devices on the outside of the housing.

SUMMARY OF THE INVENTION

The present invention provides a mounting bracket which permits quick, easy and inexpensive mounting of bracket members to a wall panel of the tractor structure, either during manufacturing operations or subsequent to purchase by the customer.

The bracket includes two L-shaped members which can be inserted through a knock-out opening in a wall member of a tractor. Each member includes abutment surfaces that permit them to be self-securing when positioned.

The bracket member or clips are simply slipped over a cross-section of the wall member to have one portion resting on the inside surface of the wall and one portion resting on the outside surface of the wall. Once in place, the two clips are interconnected with a bolt or other means to draw their abutment surfaces in contact with the inner and outer surfaces of the wall. Lighting fixtures, mirrors or other accessories can then be mounted on the bolt.

The mounting mechanism provides a simple, inexpensive, quick and easy means for adding accessories, such as lights, to the tractor.

BRIEF DESCRIPTION OF THE DRAWINGS

FIG. 3 illustrates an enlarged perspective view of a portion of the wall structure with the mounting brackets installed.

FIG. 4 illustrates an alternative embodiment of the present invention.

FIG. 5 is a view taken along lines 5—5 of FIG. 4.

DESCRIPTION OF THE PREFERRED EMBODIMENT

Figure 1:
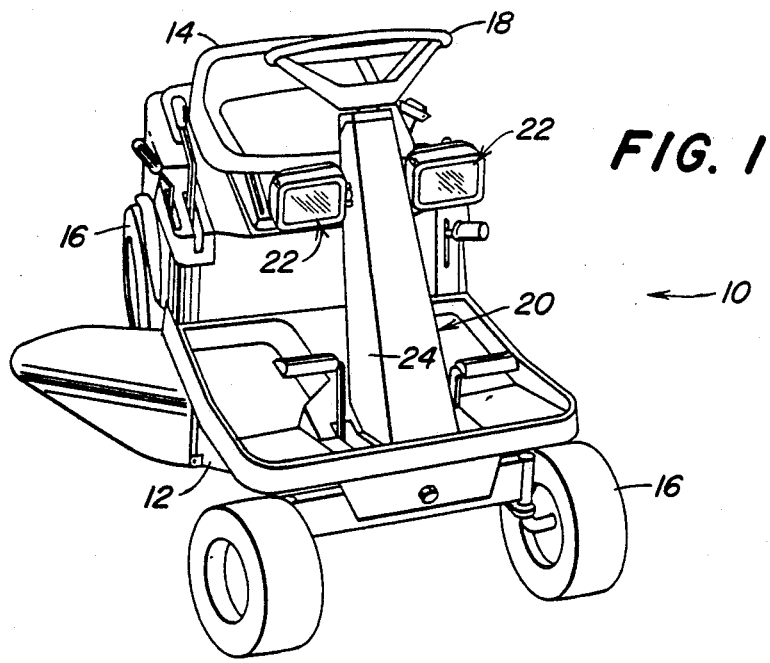
FIG. 1 illustrates a small lawn and garden tractor upon which the present invention can be utilized.

Looking now to FIG. 1, there is illustrated a lawn and garden tractor 10 equipped with a mower 12. The tractor 10 includes an operator seat 14 carried above the engine (unshown), fore-and-aft wheels 16 for carrying the tractor 10, and a steering wheel 18 carried on a steering column which is enclosed in a sheet metal housing 20.

Utilizing the mounting brackets of the present invention, two lighting fixtures 22 are carried on the side walls 24 of the steering column housing 20.

Figure 2:
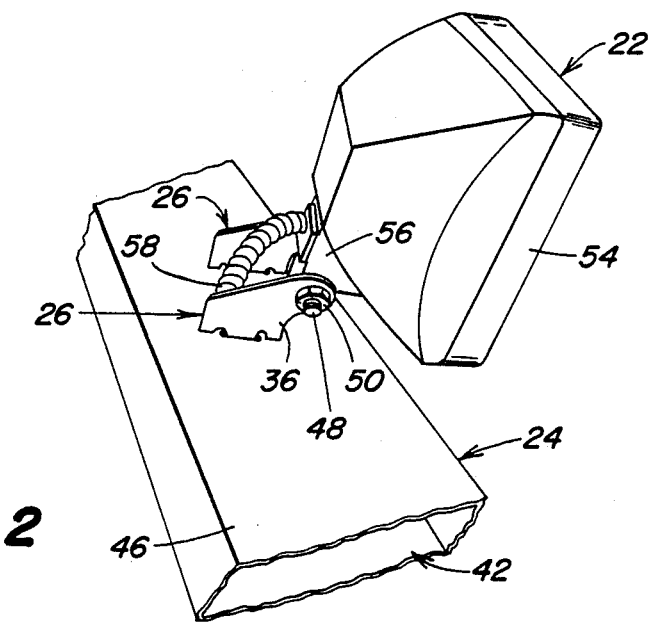
FIG. 2 illustrates an enlarged perspective view of the steering column housing wall upon which the mounting brackets are installed.

FIGS. 2 and 3 illustrate in detail the structure of the present invention. The mounting means includes first and second L-shaped brackets or clips 26 which are received through an opening 28 in the wall 24 of the steering column housing 20. The opening 28 utilized for the preferred embodiment includes a first enlarged and circular portion 28 for inserting the clips 26 or receiving an electrical wire for connection with the tractor's generator system. The opening 28 also includes a pair of spaced apart elongated openings 32 having generally parallel terminal edges 34. Each L-shaped bracket 26 includes a mounting member 36 and first leg 38 projecting generally perpendicular to the mounting member 36.

The leg 38, which is received through the elongated opening 32, includes an abutment surface 40 which is in contact with the inside surface 42 of the wall member 24. Carried on the mounting member 36 and spaced to each side of and offset from the leg 38 are second abutment surfaces 44. These abutment surfaces 44 are in contact with the outside surface 46 of the wall member 24.

To secure the two brackets 26 in place, means is provided for interconnecting them and maintaining the abutment surfaces of their legs 38 and mounting members 36 in contact with the inside and outside wall member 42 and 46. The preferred structure is a bolt 48 and nut 50 combination insertable through the openings 52 in each bracket. The bolt 48, when inserted in the openings 52 and tightened, draws the members 36 of the brackets 26 towards one another and causes the abutment surfaces 40 of the legs 38 to bite into the inside wall surface 42. Similarly, the two abutment surfaces 44 of each member 26 will bite into the outer surface 46 of the wall 24. Accordingly, the abutment surfaces 40 and 44 of the two brackets 26 will be in secure contact with the wall 24.

The preferred application for the invention utilizes the brackets 26 to carry a lighting fixture 22 which includes a headlight 54 mounted on a support 56 adapted to be carried by the bolt 48.

An electrical wire 58 leads from the light 54 through the opening 28 in the wall member 24 and down the steering column housing 20 to be connected to a prewired circuit connection of the electrical system of the tractor 10.

Looking now to FIGS. 4 and 5, there is an alternate embodiment illustrated. This embodiment is also comprised of two brackets or clips 126 being mountable through an opening 128 in the wall member 124 and having abutment surfaces 140 and 144 which engage the inside surface as well as the outside surface of the wall to hold them in place. Similarly, they would be provided with means for securing the two mounting members 126 together, such as the bolt 48, nut 50 combination illustrated in the preferred embodiment of FIG. 3. While the first abutment surface 140, which contacts the inside surface 142 of the wall member 124, is similar to the abutment surface 42 of the preferred embodiment, the second abutment surface 144 which contacts the outside surface 146 of the wall member 124 is positioned directly across the wall from the first abutment surface 140. Also, unlike the second abutment surfaces 44 of the preferred embodiment which contact the outside surface 46 of the wall member 24 laterally spaced of the first abutment surface 40, the second abutment surface 144 of the alternate embodiment engage the outside surface 146 of the wall 124 directly across from the leg 138. Futher, it is not vertically spaced from the first abutment surface 140, as are the abutment surfaces 44 illustrated in FIGS. 1, 2 and 3.

The opening 128 in the wall member 124 for inserting the brackets 126 of the alternate embodiment would preferably be rectangular or at least sufficiently wide to permit the width of the clips 126 to enter and be slipped into place over the cross section of the wall member 124.

While the alternate embodiment is illustrated as being produced from two pieces of material 100 and 102, it could be formed of a single piece of material with a U-shaped wall receiving structure.

To facilitate easier installation of the mounting brackets, either during tractor assembly or after purchase by the dealer or customer, a knock-out tab could be provided in the wall member of the steering column console.

Since the installation of the clips 26 and 126 will be essentially identical, only installation of clips 26 will be discussed. To install the mounting clips 26 of the present invention, they are first inserted through the opening 28 to position the legs 38 as illustrated in FIG. 3. The members 26 would then be pinched towards one another to bring the first abutment surface 40 of the leg 38 into contact with the inside surface 42 of the wall member 24, and the second abutment surfaces 44 into contact with the outside surface 46 of the wall member 24. The points of abutment between the wall surfaces and legal member are best illustrated in FIG. 5 and designated A and B. The bolt 48 would then be inserted through the openings 52 to pinch or draw the two members 26 toward each other and cause the abutment surfaces to bite into the wall surfaces. A support, such as 56, could then be mounted on the bolt 48 to carry a light, mirror, shield, horn or other accessory.

With the present invention of the mounting bracket, a simple, easy, inexpensive, quick and effective means is provided to mount accessories, such as lights, either during the production phase or as an aftermarket option for the purchaser.

We claim:

1. For use on a wall member with rigid inside and outside surfaces and an opening therebetween, a mounting means comprising:
   spaced apart first and second brackets receivable through the opening and each having first and second spaced apart members abutable respectively with the inside and outside surfaces of the wall, a leg member connected to and adjacent each pair of first and second members, the leg members projecting generally perpendicular to the wall when their respective first and second members are in abutment with the wall surfaces; and
   means for interconnecting the two leg members and for maintaining their respective first and second spaced apart members in abutment with the wall surfaces.

2. The invention defined in claim 1 wherein each second spaced apart member further includes first and second abutment surfaces, each surface being spaced to the side of the first member and being abutable with the outside surface.

3. The invention defined in claim 1 wherein the wall member is carried on a lawn and garden tractor.

4. The invention defined in claim 1 wherein the interconnecting means includes a bolt securable through openings in the two leg members.

5. The invention defined in claim 1 wherein the opening in the wall member is in the shape of a rectangle.

6. The invention defined in claim 1 wherein the interconnecting means further carries a lighting means.

7. For use on a wall member with rigid inside and outside surfaces and an opening therebetween, a mounting means comprising:
   first and second brackets, each bracket having a mounting member and a first abutment leg projecting generally perpendicular to the mounting member, the leg of each bracket being receivable through the wall opening to be in abutment with the inside surface of said wall and position the mounting members in a spaced apart and generally parallel relationship to each other;
   second and third abutment surfaces carried on each mounting member, spaced to each side of and offset from the abutment leg adjacent the mounting member to be in contact with the wall's outside surface when the leg is in abutment with the inside surface; and
means for interconnecting the two mounting members to secure their respective abutment surfaces in contact with the wall surfaces.

8. The invention defined in claim 7 wherein the wall member is carried on a lawn and garden tractor.

9. The invention defined in claim 8 wherein the means interconnecting the two mounting members includes strucure adapted to carry a headlight.

10. Mounting means connectable to a wall member having rigid inside and outside surfaces and an opening therebetween, comprising:
spaced apart first and second brackets,
   each bracket having first and second adjoining legs, each first leg having an abutment surface, each second leg having first and second abutment surfaces laterally spaced to the sides of the abutment surface of the first leg and vertically removed therefrom, the first leg of each bracket being insertable through the opening to permit its abutment surface to be in contact with the inside surface of the wall and the first and second abutment surfaces of each second leg to be in contact with the outside wall whereby the second legs of the two brackets are generally parallel and spaced apart; and means for interconnecting the second legs of the two brackets to maintain contact between the abutment surfaces of each bracket and the wall member.

11. The invention defined in claim 10 wherein the brackets are mounted on a lawn and garden tractor and support a lighting fixture.

12. The invention defined in claim 10 wherein the opening in the wall includes spaced apart openings having generally parallel terminal edges.

13. The invention defined in claim 12 wherein the wall includes portions spaced generally parallel to the terminal edges whereupon the first and second abutment surfaces may rest.

14. The invention defined in claim 12 wherein each spaced apart opening has the general form of the letter T.

15. The invention defined in claim 10 wherein the means for interconnecting the two legs comprises an opening in each leg and a bolt securable therethrough.

16. The invention defined in claim 15 wherein a light is supported by the bolt.

* * * * *